United States Patent [19]

Hegar et al.

[11] 4,028,323

[45] June 7, 1977

[54] PROCESS FOR MAKING AZO COMPOUNDS BY COUPLING WITH NITROSATED HETEROCYCLIC PRIMARY AMINES

[75] Inventors: Gert Hegar, Schoenenbuch; Hans-Joerg Angliker, Basel, both of Switzerland

[73] Assignee: Ciba-Geigy AG, Basel, Switzerland

[22] Filed: Oct. 8, 1975

[21] Appl. No.: 620,665

Related U.S. Application Data

[63] Continuation of Ser. No. 217,242, Jan. 12, 1972, abandoned, which is a continuation-in-part of Ser. No. 794,381, Jan. 27, 1969, abandoned.

[52] U.S. Cl. .............................. 260/157; 260/144; 260/152; 260/155; 260/156; 260/158; 260/162; 260/163
[51] Int. Cl.$^2$ ........................................ C09B 27/00
[58] Field of Search .......... 260/152, 157, 158, 162, 260/163

[56] References Cited

OTHER PUBLICATIONS

Houben–Weyl, "Methoden der Organischen Chemie," vol. 10/3, pp. 332 to 336, (1965).
Huttel et al., Ber. Deut. Chem. Gesell., vol. 88, pp. 1577 to 1585, (1955).

*Primary Examiner*—Floyd D. Higel
*Attorney, Agent, or Firm*—Karl F. Jorda; Edward McC. Roberts; Michael W. Glynn

[57] ABSTRACT

The invention relates to a process for the manufacture of azo compounds by reacting a nitrosated heterocyclic primary amine with, as a coupling component, an aminobenzene which is substituted in the amino group thereof by lower alkyl or lower cyanoalkyl, in the presence of a weakly acid medium and at a temperature of from room temperature to about 100° C.

10 Claims, No Drawings

PROCESS FOR MAKING AZO COMPOUNDS BY COUPLING WITH NITROSATED HETEROCYCLIC PRIMARY AMINES

The instant application is a Continuation of U.S. application Ser. No. 217,242 filed Jan. 12, 1972, now abandoned, which in turn was a Continuation-in-Part of U.S. application Ser. No. 794,381 filed Jan. 27, 1969, now abandoned.

Although there is no record in the literature of nitrosamines being included in the series of aromatic amines, a number of nitrosamines of heterocyclic diazo components is known, for example, those of pyrazolones, indazolones, triazoles, tetrazoles, isoxazoles, oxidazoles, thiazoles and thiadiazoles, which can be prepared by reacting an appropriate amine with nitrous acid in a slightly acid medium, some of them being quite stable. It is also known that these nitrosamines may be converted into the corresponding diazo compounds in the presence of a mineral acid and that the diazo compounds are capable of coupling. In the manufacture of azo dyestuffs it is known, however, that preparation and isolation of the nitrosamines is dispensed with, that is to say, the amine is reacted directly with nitrous acid in a strongly acid medium. Nitrosylsulphuric acid is generally used as the diazotizing reagent for the weakly basic heterocyclic diazo components, generally in the presence of a diluent or a compound that accelerates the reaction, for example, acetic acid and propionic acid or mixtures thereof.

The observation has been made that in the case of heterocyclic amines the often cumbersome and time-consuming process of diazotization is not necessary, and that all that is required is to prepare the nitrosamine with nitrous acid in a suitable reaction medium, to which the coupling component is then added, if necessary, dissolved in a suitable solvent. The desired azo dyestuff is formed by this process in a good yield, in many cases without the application of heat, although it is preferably to heat the reaction mixture.

The present invention therefore provides a process for the manufacture of azo compounds, wherein the nitroso compound of a primary heterocyclic amine is reacted with a coupling component in a weakly acid medium to form the corresponding azo compound.

The most advantageous method of carrying out the reaction is to add the coupling component, which is preferably dissolved in the same solvent as that used for the preparation of the nitrosamine, to the solution of the nitrosamine. If formation of the dyestuff proceeds slowly or not at all at a low temperature, it can be accelerated by heating.

The process of manufacturing the nitrosamines used as starting materials is known (cf., for example, J. Goerdeler and K. Deselaers, Chem. Ber. 91, 1025 [1958] and H. Gehlen, Liebigs Ann. chem. 665, 144 [1963]). The nitrous acid required for this purpose may be obtained by the addition of an alkali nitrite, either solid or in the form of an aqueous solution, to the weakly acid solutions of the heterocyclic amines. Other reagents that may be used in the preparation of diazonium salts, for example, organic nitrites or nitrous gases, also bring about the formation of nitrosamines. Suitable media for the reaction are dilute aqueous solutions of mineral acids with a proton concentration of at most 2 moles per liter, for example, hydrochloric acid, sulfuric acid, nitric acid or phosphoric acid, but especially dilute aqueous solutions of $C_1$–$C_4$-carboxylic acids with a pK-value from about 0,6 to 5, such as acetic acid, mono-, di-and trichloroacetic acid, oxalic acid, malonic acid, propionic acid and especially formic acid. The reaction in which the nitrosamines are produced is always carried out in a much weaker acid medium than is required for the corresponding diazotization process. The organic acids mentioned above are especially suitable because of their good solvent power in respect of many heterocyclic diazo components; in most cases they are also good solvents for the coupling components used.

Suitable coupling components are compounds of any kind that are capable of coupling, for example, those of the benzene, naphthalene or heterocyclic series, especially of 5- or 6-membered nitrogen-containing heterocycles, which may contain a fused benzene ring.

Such coupling components are e.g. the phenols, aminobenzenes, naphthols and aminonphthalenes, which are unsubstituted or substituted by lower alkyl, lower alkoxy, carboxylic acid amide, -N-lower alkylamide or -lower alkyl-ester groups, chloro, bromo and acylamino (acyl meaning the radical of a lower carboxylic acid, carbonic acid mono lower alkyl ester,-monoamide, N-lower alkyl substituted monoamide), unsubstituted or lower alkyl-, lower hydroxyalkyl-, lower cyanoalkyl-, lower alkoxy-, chloro-, cyano-, nitro- or phenyl-substituted indoles, unsubstituted or lower alkyl-, lower hydroxyalkyl-, lower cyanoalkyl-, phenyl-, lower alkyl-phenyl-, chlorophenyl-, nitrophenyl- or carboxy-substituted 5-hydroxy- or 5-aminopyrazoles, unsubstituted or lower alkyl-, lower alkoxy- or chloro-substituted 4-hydroxyquinolones-2, unsubstituted or lower alkyl-substituted tetrahydroquinolines or amino- or hydroxy-substituted pyrimidines wherein lower means containing 1 to 7 carbon atoms. The amino groups of the phenylamines and naphthylamines may be substituted by lower alkyl, phenyl or phenyllower alkyl. Preferred phenylamines are N- loweralkylaminobenzene, N-cyanoloweralkylaminobenzene and N,N-dicyanoloweralkylaminobenzenes which may contain in the nucleus the substituents mentioned above. Examples of coupling components of the benzene series which may be mentioned in addition to the phenols, for example, paracresol, are, in particular, the aminobenzenes, for example, aniline, 3-methylaniline, 2-methoxy-5-methylaniline, 3-acetylamino-1-aminobenzene, N-methylanilino, N,β-hydroxyethyl-aniline, N,β-methoxyethylaniline, N,β-cyanoethylanilino, N,β-chloroethylaniline, dimethylaniline, diethylaniline, N-methyl-N-benzylaniline, N,n-butyl-N,β-chloroethylaniline, N-methyl-N,β-cyanoethylaniline, N-methyl-N,β-hydroxyethylaniline, N-ethyl-N,β-chloroethylaniline, N-methyl-N,β-acetoxyethylaniline, N-ethyl-N,β-methoxyethylaniline, N,β-cyanoethyl-N,β-chloroethylaniline, N-cyanoethyl-N-acetoxyethylaniline, N,N-di(β-hydroxyethyl)-aniline, N,N-di-(β-acetoxyethyl)-aniline, N-ethyl-N,β-hydroxy-γ-chloropropylaniline, N,N-di-(β-cyanoethyl)-aniline, N,N-di-(β-cyanoethyl)-3-methylaniline, N,β'-cyanoethyl-N,β''-hydroxyethyl-3-chloroaniline, N,N-di(β-cyanoethyl)-3-methoxyaniline, N,β'-cyanoethyl-N,β''-hydroxyethyl-3-ureidonanilino, N,N-dimethyl-3-acetylaminoaniline, N-ethyl-N,β-cyanoethyl-3-acetyl-aminoaniline, N,N-di-β-cyanoethyl-2-methoxy-5-acetylaminoaniline, N,N-di-(β-cyanoethoxyethyl)-aniline, N-methyl-N-phenacetyl-aniline, N,β-cyanoethyl-2-chloroaniline, N,N-diethyl-3-trifluoro-methylaniline, N-ethyl-N- phenylaniline, diphenylamine, N-methyldiphenylamine, N-methyl-4-ethoxydiphenylamine or N-phenylmorpholine, and also, for example, amines of the formula

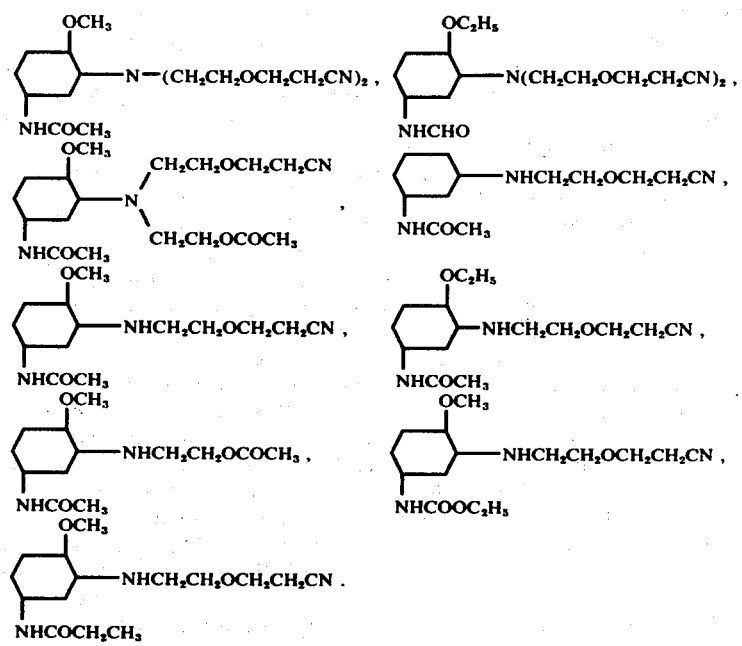

in which $R_1'$ represents a hydrogen atom or an alkyl or alkoxy group, $R_2'$ represents a cyanoalkoxyalkyl group, $R_3'$ represents a hydrogen atom, a cyanoalkoxyalkyl group or an acyloxyalkyl group and $R_4'$ represents a hydrogen atom, an alkyl, cycloalkyl or alkoxy group that may be substituted or a benzene residue, and especially those of the formula

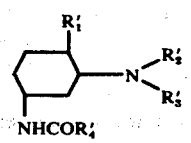

in which $R_1'$ and $R_4'$ have the meanings given above.

Specially valuable results may also be obtained by using coupling components of the formula

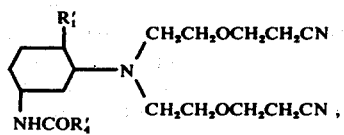

and

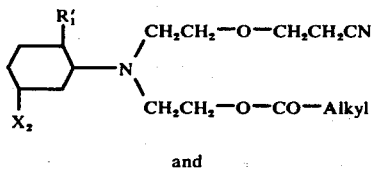

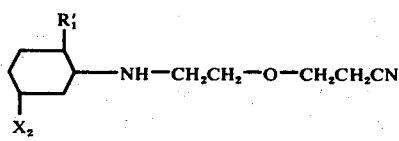

in which $R_1'$ has the meaning given above and $X_2$ represents an acylamino group, and in which Alkyl represents, for example, a methyl, ethyl or propyl group.

The following coupling components are given as examples:

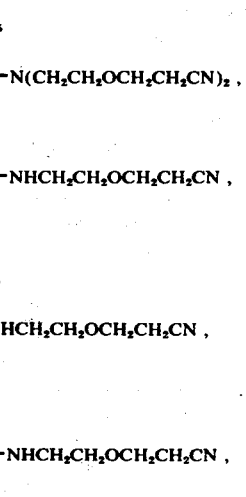

The coupling components of the naphthalene series which may be mentioned in addition to the naphthols are, for example, 1- or 2-naphthylamine, 2-phenylaminonaphthalene, 1-dimethylaminonoaphthalene and 2-ethylaminonaphthalene, and also 2-aminonaphthalene-3-carboxylic acid amide, 2-aminonaphthalene-3-carboxylic acid anilide, 2-aminonaphthalene-3-carboxylic acid-N-methylanilide, 2-aminonaphthalene-3-carboxylic acid benzylamide, 2-aminonaphthalene-3-carboxylic acid methylester, 2-aminonaphthalene-3-carboxylic acid butylester, 2-aminonaphthalene 3-carboxylic acid-$\beta$-hydroxyethylester and 2-aminonaphthalene-3-carboxylic acid phenylester. Heterocyclic coupling components are, for example, the indoles, for example, 2-methylindole, 2,5-dimethylindole, 2,4-dimethyl-7-methoxyindole, 2-phenyl- or 2-methyl-5-ethoxyindole, 2-methyl-5- or -6-chloroindole, 1,2-dimethylindole, 1-methyl-2-phenylindole, 2-methyl-5-nitroindole, 2-methyl-5-cyanoindole, 2-methyl-7-chloroindole, 2-methyl-5-fluoro- or -5-bromoindole, 2-methyl-5,7-dichloroindole or 2-phenylindole and 1-cyanoethyl-2,6-dimethylindole, and also pyrazoles, for example, 1-phenyl-5-aminopyrazole, 3-methyl-pyrazolone-5, 1-phenyl-3-methylpyrazolone-5, 1,3-dimethylpyrazolone-5, 1-butyl-3-methylpyrazolone-5, 1-hydroxyethyl-3-methylpyrazolone-5, 1-cyanoethyl-3-methylpyrazolone-5, 1-(orthochlorophenyl)-3-methylpyrazolone-5, 3-carbomethoxypyrazolone-5, quinolines, for example, 1-methyl-4-hydroxyquinolone-2or Nethyl-3-hydroxy-7-methyl-1,2,3,4-tetrahydroquinoline or pyrimidines, for example, barbituric acid, and also 1,3-indanedione, 1,8-naphthoindanedione or dimedone. Further coupling components that may be used, for example, are those listed in French Patent Specifications Nos. 1182529, 1184700, 1352623, 1483235 and 1513624. Heterocyclic amines, the nitroso compounds of which are suitable for reaction with the coupling components in accordance with the process of the invention, are especially those which contain a heterocyclic five-membered ring possessing 2 or 3 hetero atoms, especially a nitrogen atom and one or two sulphur, oxygen or nitrogen atoms, for example thiazoles, benzthiazoles 1,3,4-thiadiazoles, 1,2,4-thiadiazoles, isothiazoles, benzisothiazoles and the corresponding oxazoles, isoxazoles, oxidazoles, selenazoles, isoselenazoles and selenadiazoles, which contain no other substitutents than lower alkyl, phenyl, phenyl substituted by nitro, lower alkylthio, lower alkoxy, lower alkyl, chloro or bromo; aralkyl, especially benzyl, cycloalkyl especially cyclohexyl, cyano, thiocyano, chloro, bromo, lower alkylthio, lower alkoxy, lower alkylsulfonyl, nitro, loweralkoxycarbonyl, sulfonamide, N-lower alkyl sulfonamide trifluoromethyl, phenylazo and lower alkanoyl. The 2-aminothiazoles are unsubstituted or substituted by lower alkoxy, lower alkanoyl, lower alkoxycarbonyl, thiocyano, cycloalkyl, aralkyl, trifluoromethyl and preferably by chloro, bromo, cyano, nitro, lower alkylsulfonyl, lower alkyl and phenyl.

The 2-aminobenzthiazoles are unsubstituted or substituted by phenyl, aralkyl, cycloalkyl, thiocyano, lower alkylthio, sulfonamide and sulfonamide substituted by lower alkyl, trifluoromethyl, lower alkanoyl and preferably by lower alkyl, lower alkoxy, cyano, nitro, chloro, bromo, lower alkoxycarbonyl. The cycloalkyl and aralkyl groups are usually cyclohexyl and benzyl. The 3-or 5-aminoisothiazoles are unsubstituted or substituted by lower alkyl, phenyl or cyano. The 3-aminobenzisothiazoles are unsubstituted or substituted by lower alkyl, chloro, bromo, nitro, lower alkoxy, lower alkylsulfonyl or lower alkyl- or dialkylsulfonamido. The 2-amino-1,3,4- or 1,3,5- thiadiazoles are unsubstituted or substituted by lower alkyl, lower alkoxy, lower alkylthio, benzylthio, lower alkylsulfonyl bromo and preferably chloro and phenyl. The phenyl residue is unsubstituted or substituted by nitro, lower alkylthio, lower alkyl, lower alkoxy, chloro and bromo and "lower" means containing at most 7 carbon atoms. Examples of such heterocyclic amines are: 2-aminothiazole, 2-amino-5-nitrothiazole, 2-amino-5-cyanothiazole, 2-amino-4-methyl-5-nitrothiazole, 2-amino-4-methylthiazole, 2-amino-4-methylthiazole, 2-amino-4-phenyl-thiazole, 2-amino-4-(4'-chloro)-phenylthiazole, 2-aminobenzthiazole, 2-amino-6-methylbenzthiazole, 2-amino-6-cyanobenzthiazole, 2-amino-6-methoxybenzthiazole, 2-amino-6-carbethoxybenzthiazole, 2-amino-6-chlorobenzthiazole, 2-amino-6-methylsulphonyl-benzthiazole and 2-amino-6-nitrobenzthiazole, as well as 2-amino1,3,4-thiadiazole, 2-amino-1,3,5-thiadiazole, 2-amino-4-methyl- or -4-phenyl-1,3,5-thiadiazole, 2-amino-5-methyl-or 5-phenyl-1,3,5-thiadiazole, 3-amino-2,1-benzisothiazole, 3-amino-4-nitro-2,1-benzisothiazole, 3-amino-5-chloro-benzisothiazole, 5-amino-3-methyl-isothiazole and 5-amino-3-phenyl-isothiazole.

The new process is especially suitable in cases where very weakly basic heterocyclic diazo components are used and diazotization has to be carried out in a strongly acid medium, generally an anhydrous medium in view of the instability of the diazo compounds. Since the formation of the nitrosamines generally proceeds very rapidly and usually at a pH value that is higher by at least 1 or 2 units, the new process ensures a considerable saving in time, coupled with an improvement in yield, and it also has the advantage that there is no need for the neutralization of a large amount of mineral acid when dyestuff formation is complete.

The azo compounds obtained by the process of the present invention may be used as azo dyestuffs of may types, for example, reactive dyestuffs, acid wool dyestuffs, direct dyestuffs, disperse dyestuffs, basic dyestuffs, pigments, and so forth.

The following Examples illustrate the invention, the parts and percentages being by weight, unless otherwise stated.

EXAMPLE 1

177 parts of 5-amino-3-phenyl-1,2,4-thiadiazole are dissolved in 1,000 parts of 85 % formic acid, and 70 parts of solid sodium nitrite are added at 5° C. Stirring is carried out for 20 minutes, a solution of 160 parts of N-methyl-N,2-cyanoethylaniline in 160 parts of 85 % formic acid is added to the white nitrosmaine slurry and the batch is heated to 60° C. After stirring for 2 hours at the temperature, the azo dyestuff which forms, precipitates in the form of a thick, reddish brown slurry. The batch is diluted with 1,000 parts of water, the dyestuff is isolated by filtration and washed with a copious amount of cold water and dried. 330 Parts of the disperse dyestuff of the formula

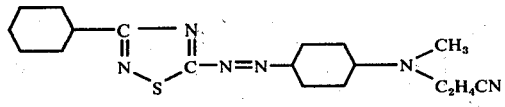

are obtained which dyes polyester fibres and fast red shade. The yield amounts to 95 % of the theoretical yield.

By replacing the N-methyl-N,2-cyanoethylaniline with 231 parts of the bifunctional coupling component of the formula

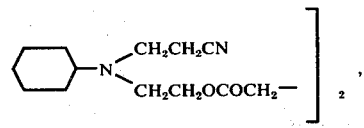

384 parts of the disazo dyestuff of the formula

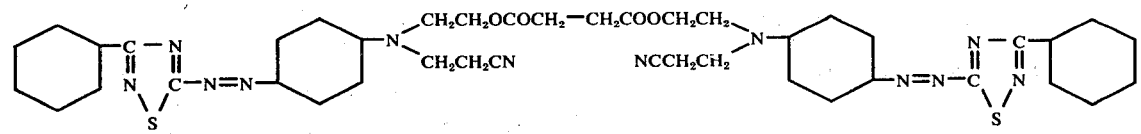

are obtained which dyes polyester fibres a fast scarlet shade. The yield amounts to 89.4% of the theoretical yield.

By replacing the 5-amino-3-phenyl-1,2,4-thiadiazole with an equivalent amount of 2-amino-6-cyanobenzthiazole, 2-amino-6-carbethoxy-benzthiazole or 2-amino-6-methylsulphonyl-benzthiazole and following the procedure described in Example 1, disperse dyestuffs are obtained that dye polyester fibres red and scarlet shades respectively, possessing similar properties of fastness.

EXAMPLE 2

The nitrosamine is prepared in the manner described in Example 1. 263 Parts of N,2-(N'-phenyl-N'-ethyl)-amino-ethylpyridinium chloride in the form of a 50 % aqueous solution are added as coupling component and the batch is heated for 2 hours at 60° C. 8,500 parts of water are added and the dyestuff is precipitated by the addition of 1,000 parts of sodium chloride. After drying, 480 parts of a 76 % dyestuff preparation are obtained, that is to say, 365.3 parts (81 % of the theoretical yield) of the pure basic dyestuff of the formula

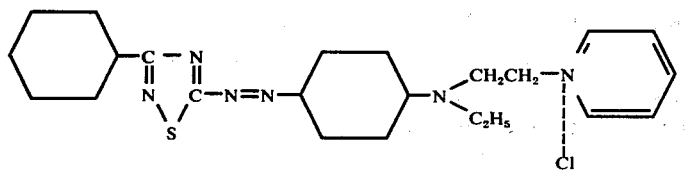

which dyes polyacrylonitrile a fast red shade.

When the same dyestuff is prepared by conventional diazotization and coupling, 375 parts of a 72 % dyestuff preparation are obtained, that is to say, 270.6 parts (60 % of the theoretical yield) of the pure dyestuff.

By replacing the above-mentioned coupling component with 1-phenyl-3-methyl-5-pyrazolone-3'-sulphonic acid, the procedure as per Example 2 yields an acid dyestuff of the formula

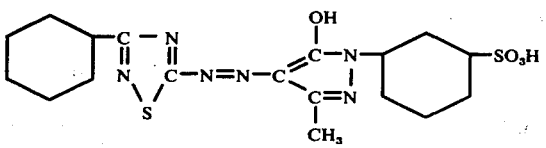

which dyes wool a strong yellow shade.

When the N,2-(N'-phenyl-N'-ethyl)-aminoethyl-pyridinium chloride is replaced by 3-methylpyrazolone-(5), the procedure as per Example 2 yields a disperse dyestuff of the formula

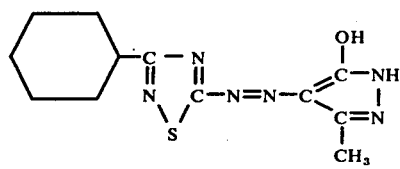

which dyes polyester fibres a red shade. When using 2-naphthol as coupling component, the procedure as per Example 2 yields a disperse dyestuff of the formula

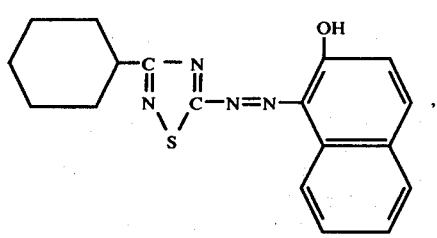

which dyes polyester fibres an orange shade.

EXAMPLE 3

19.4 Parts of 2-amino-6-ethoxybenzthiazole are dissolved in 125 parts of glacial acetic acid and then 100 parts of ice are added to the solution. 25 Parts of a 4N sodium nitrite solution are then quickly added while stirring well, whereupon a voluminous brown precipitate forms immediately. The batch is stirred for 5 minutes and then a solution of 16 parts of N-methyl-N,2-cyanoethylaniline is added, the solution turning only slightly red. The red coloration intensifies rapidly however when the batch is heated to 30°to 40° C; the dyestuff of the formula

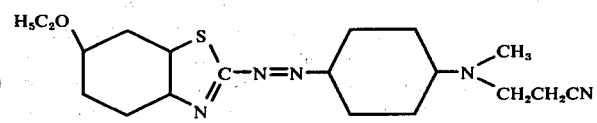

precipitates almost completely in a crystalline form after 10 minutes. the batch is diluted with 100 parts of water, the dyestuff is isolated by suction filtration, washed with 100 parts of hot water and dried. 3.15 Parts of a red dye-stuff powder are obtained. A thin-layer chromatogram shows it to be completely homogeneous and it dyes polyester fibres a fast red shade.

When the 2-amino-6-ethoxybenzthiazole is replaced by an equivalent amount of 2-aminobenzthiazole, 2-amino-6-methylbenzthiazole, 2-amino-6-methoxybenzthiazole or 2-amino-5-methyl-1,3,4-thiadiazole, the procedure described in Example 1 yields disperse dyestuffs that dye polyester fibres red shades possessing similar properties of fastness.

EXAMPLE 4

15 parts of 2-aminobenzthiazole are dissolved in 100 parts by volume of 2N hydrochloric acid. 100 parts of ice are added and then 25 parts by volume of a 4N solution of sodium nitrite in water are dropped into the stirred solution over a period of 15 minutes. Stirring is continued for 10 minutes, followed by the addition of a mixture from 17,4 parts of N-ethyl-N,2-cyanoethylaniline and 50 parts of propionic acid. On heating to 50° C the reaction mixture turns to a dark bluish red. After stirring at 50° C for another 30 minutes, the mixture is diluted with 500 parts of water. 14 parts of sodium acetate crystals are added and the bluish red dyestuff is filtered by suction. It dyes polyester fibres brilliant red shades.

Following the prescriptions of examples 1 to 4, further dyestuffs are obtained by nitrosating the heterocyclic amines indicated in column II of the following table in the acidic medium described in column III and condensing with the coupling components of column IV. The shades obtained on the appropriate fibre material are given in column V.

| No. | heterocyclic amine | nitrosating medium | coupling component | shade on fibre |
|---|---|---|---|---|
| 1 | 2-amino-5-bromo-thiazole | 2 N phosphoric acid | N,2-methoxyethylaniline | red on polyester |
| 2 | 2-amino-5-cyano thiazole | 30% solution of chloroacetic acid in water | N,2-chloroethylaniline | red on polyester |
| 3 | 2-amino-5-methyl-sulphonylthiazole | 100% formic acid | N-methyl-N,β-acetoxymethyl-3-methylaniline | red on polyester |
| 4 | 2-amino-6-cyano-benzthiazole | 50% solution of trichloroacetic acid in water | N,β-chloroethyl-N,β'-hydroxy-ethyl-3-chloroaniline | bluish red on polyester |
| 5 | 2-amino-6-nitro-benzthiazole | 85% formic acid | N-ethyl-N,β-cyanoethyl-3-acetylaminoaniline | violet on polyester |
| 6 | '' | '' | N-ethyl-N,β-(pyridinium-chloride)-ethylaniline | violet on polyacrylonitrile |
| 7 | 2-amino-6-methoxy-benzthiazole | N hydrochloric acid | '' | red on polyacrylonitrile |
| 8 | '' | N sulfuric acid | 2-naphtylamine-1-sulfonic-acid | red on polyester |
| 9 | 2-amino-6-chloro-benzthiazole | 10% solution of oxalic acid in water | 1,2-dimethylindole | orange on polyester |
| 10 | 2-amino-6-ethylbenz-thiazole | 25% formic acid | 1,3-dimethylpyrazolon-5- | yellow on polyester |
| 11 | '' | '' | 1-methyl-4-hydroxyquinolone-2 | '' |
| 12 | 2-amino-5-methyl-1,3,4-thiadiazole | N phosphoric acid | 3-methylpyrazolone-5 | yellow on polyester |
| 13 | 2-amino-5-(4'-chloro-phenyl)-1,3,4-thiadiazole | 85% formic acid | N-phenyl morpholine | red on polyester |
| 14 | 2-amino-5-phenyl-1,3,4-thiadiazol | '' | N,N-di-(β-cyanoethoxyethyl)-anilin | '' |
| 15 | '' | 2N hydrochloric acid | diphenylamine | bluish red on polyester |
| 16 | '' | 75% chloroacetic acid | N,2-(N'-phenyl-N'-ethyl)-amino-ethyltrimethylammonium chloride | red on polyacrylonitrile |
| 17 | '' | 100% formic acid | 2-naphthylamine-6-sulfonic-acid-3-dimethylaminopropyl-amide | red on polyacrylonitrile |
| 18 | '' | glacial acetic acid | 1-ethyl-3-cyano-4-methyl-6-hydroxypyridone-2 | yellow on polyester |
| 19 | '' | 80% formic acid | 1-phenyl-3-methylpyrazolone-5-3'-sulfonic acid | yellow on polyamide |
| 20 | 2-amino-4-methyl-1,3,5-thiadiazole | N sulfuric acid | 2-amino-5-fluoroindole | yellow on polyester |
| 21 | '' | 5% formic acid | 1-cyanoethyl-2,6-dimethyl-indole | '' |
| 22 | 2-amino-4-ethoxy-1,3,5-thiadiazole | 25% acetic acid | 1-butyl-3-methylpyrazolone-5 | '' |
| 23 | 2-amino-4-benzylthio-1,3,5-thiadiazole | 25% chloroacetic acid | 3-carbomethoxy-pyrazolone-5 | '' |
| 24 | 2-amino-4-phenyl-1,3,5-thiadiazole | 80% formic acid | N-ethyl-N,β-cyanoethyl-aniline | red on polyester |
| 25 | '' | '' | N-ethyl-N-phenylethylaniline | '' |
| 26 | '' | '' | N-ethyl-N,β-cyanoethyl-3-methylaniline | '' |
| 27 | '' | '' | N,2-(N'-phenyl-N'-ethyl)-amino-ethyltrimethylammonium-chloride | red on polyacrylonitrile |
| 28 | '' | '' | N,2-(N'-phenyl-N',β-cyanoethyl-amino)-ethylpyridinium bromide | '' |
| 29 | '' | '' | N,β-acetoxyethyl-N,β'-chloro-ethylaniline | red on polyester |
| 30 | 2-amino-4-phenyl-1,3,5-thiadiazole | 75% solution of chloroacetic acid in water | indane-1,3-dione | yellow on polyester |
| 31 | '' | '' | 2-naphthol | reddish yellow on polyester |
| 32 | '' | 80% formic acid | N,2-(N'-[2'-methoxy-5'-acetylamino-phenyl]-N'-methyl)-aminoethyl-N-methylpiperidinium-toluene-sulfonate | bluish red on polyacrylonitrile |
| 33 | 2-amino-4-ethylthio-1,3,5-thiadiazole | 20% formic acid | 2-naphtol-7-sulfonic acid | yellow-brown on polyamide |
| 34 | 2-amino-4-(4'-methyl-phenyl)-1,3,5-thiadiazole | 80% formic acid | 1-phenyl-3-carbethoxypyrazolone-5-4'-sulfonic acid | yellow on polyamide |
| 35 | 2-amino-4-(3'-chloro-phenyl)-1,3,5-thiadiazole | '' | resorcinol dimethyl ether | yellow on polyester |
| 36 | 2-amino-4-(4'-nitro-phenyl)-1,3,5-thiadiazole | 100% formic acid | 3-acetylamino-1-aminobenzene | red on polyester |

What we claim is:

1. A process for the manufacture of azo compounds which comprises reacting the nitrosated primary amine of thiazole, benzthiazole, 1,3,4-thiadiazole, 1,2,4-thiadiazole, isothiazole, benzisothiazole, oxazole, benzoxazole, 1,3,4-oxadiazole, 1,2,4-oxadiazole, isoxazole, benzisoxazole, selenazole or benzselenazole which are unsubstituted or contain no other substituents than lower alkyl, phenyl, phenyl substituted by nitro, lower alkylthio, lower alkoxy, lower alkyl, chloro or bromo;

benzyl cyclohexyl, cyano, thiacyano, chloro, bromo, lower alkylthio, lower alkoxy, lower alkylsulfonyl, nitro, lower alkoxycarbonyl, sulfonamide, N-lower alkyl sulfonamide, trifluoromethyl, phenylazo and lower alkanoyl, where lower means containing 1 to 7 carbon atoms, with, as an azo coupling component, aminobenzene which contains a member selected from the group consisting of lower alkyl and lower cyanoalkyl attached to the amino group and which is unsubstituted or substituted in the nucleus by a member selected from the group consisting of chlorine, bromine, lower alkyl, lower alkoxy and acylamino, wherein "lower" means containing at most 7 carbon atoms and "acyl" is lower alkanoyl, carbamoyl, N-lower alkyl carbamoyl or benzoyl in a weakly acid medium at a temperature of from room temperature to about 100° C.

2. A process for the manufacture of azo compounds according to claim 1 wherein nitrosated primary amine of thiazole, benzthiazole, 1,3,4-thiadiazole, 1,2,4-thiadiazole, isothiazole, benzisothiazole, oxazole, benzoxazole, 1,3,4-oxadiazole, 1,2,4-oxadiazole, isoxazole, benzisoxazole, selenazole or benzselenazole containing no other substituents than lower alkyl, phenyl, phenyl substituted by nitro, lower alkylthio, lower alkoxy, lower alkyl, chloro or bromo; benzyl, cyclohexyl, cyano, thiocyano, chloro, bromo, lower alkylthio, lower alkoxy, lower alkylsulfonyl, nitro, lower alkoxycarbonyl, sulfonamide, N-lower alkyl sulfonamide, trifluoromethyl, phenylazo and lower alkanoyl where lower means containing 1 to 7 carbon atoms is reacted with, as a coupling component, aminobenzene which contains a member selected from the group consisting of lower alkyl and lower cyanoalkyl attached to the amino group and which is unsubstituted or substituted in the nucleus by a member selected from the group consisting of chlorine, bromine, lower alkyl, lower alkoxy and acylamino, wherein "lower" means containing at most 7 carbon atoms and "acyl" is lower alkanoyl, carbamoyl, N-lower alkyl carbamoyl or benzoyl, in a weakly acid medium at a temperature of from room temperature to 100° C.

3. A process according to claim 2 wherein the coupling component is N-loweralkylaminobenzene, N-cyanoloweralkylaminobenzene or N,N-dicyanoloweralkylaminobenzene which may contain in the nucleus no other substituents than chlorine, lower alkyl, lower alkoxy, lower alkanoylamino, carbamoylamino or N-lower alkyl carbamoylamino wherein "lower" means containing at most 7 carbon atoms.

4. A process according to claim 2 wherein the nitrosated compound used is nitrosated unsubstituted or chloro-, bromo-, cyano-, nitro-, lower alkylsulfonyl-, lower alkyl-, phenyl-substituted 2-aminothiazole; nitrosated unsubstituted or lower alkyl-, lower alkoxy-, cyano-, nitro-, chloro- bromo-, lower alkoxy-carbonyl-substituted 2-aminobenzthiazole; nitrosated unsubstituted or lower alkyl-, phenyl, cyano-substituted 3-amino- or 5-amino-isothiazole; nitrosated unsubstituted or lower alkyl-, chloro-, bromo-, nitro-, lower alkoxy-, lower alkylsulfonyl- or N-loweralkyl- or N,N-diloweralkylsulfonamido-substituted 3-aminobenzisothiazole; nitrosated unsubstituted or lower alkyl-, lower alkoxy, lower alkythio-, benzylthio-, lower alkylsulfonyl, bromochloro- or phenyl-substituted 2-amino-1,3,4-or 1,3,5-thiadiazole, wherein the phenyl residue is unsubstituted or substituted by nitro, lower alkylthio, lower alkyl, lower alkoxy, chloro or bromo and "lower" means containing at most 7 carbon atoms.

5. A process according to claim 2 in which the weakly acid medium comprises a mixture of water and a $C_1$-$C_4$ carboxylic acid.

6. A process according to claim 4 in which the nitrosated amine is nitrostated 2-amino-6-lower alkoxybenzthiazole.

7. A process according to claim 4 in which the nitrosated amine is nitrosated 5-amino-3-phenyl-1,2,4-thiadiazole.

8. A process according to claim 2 in which the resulting azo compound is recovered from the reaction medium.

9. A process according to claim 2 in which the heterocyclic primary amine is nitrosated by the action of an alkali metal nitrate in a weakly acid solution thereof.

10. A process according to claim 2 in which the heterocyclic primary amine is first nitrosated by the action of an alkali nitrate in a weakly acid solution thereof, and thereafter coupled by adding a mixture of said coupling component and weakly acid solution.

* * * * *

UNITED STATES PATENT OFFICE
CERTIFICATE OF CORRECTION

Patent No. 4,028,323      Dated June 7, 1977

Inventor(s) Gert Hegar et al.

It is certified that error appears in the above-identified patent and that said Letters Patent are hereby corrected as shown below:

First page of Patent insert --

FOREIGN APPLICATION PRIORITY DATE

February 19, 1968     Switzerland     2380/68

November 29, 1968     Switzerland     17797/68

Signed and Sealed this sixteenth Day of August 1977

[SEAL]

Attest:

RUTH C. MASON
*Attesting Officer*

C. MARSHALL DANN
*Commissioner of Patents and Trademarks*